United States Patent [19]

Dreyer et al.

[11] Patent Number: 5,657,253

[45] Date of Patent: Aug. 12, 1997

[54] APPARATUS FOR MONITORING THE PERFORMANCE OF A MICROPROCESSOR

[75] Inventors: Robert S. Dreyer, Sunnyvale; Donald B. Alpert, Santa Clara, both of Calif.

[73] Assignee: Intel Corporation, Santa Clara, Calif.

[21] Appl. No.: 883,845

[22] Filed: May 15, 1992

[51] Int. Cl.$^6$ ...................................... G01B 21/00
[52] U.S. Cl. ................ 364/551.01; 364/737; 395/500
[58] Field of Search ............... 364/551.01, 900, 364/737; 395/500, 575; 371/22.5, 16.1, 16.5, 24, 29.5, 25.1

[56] References Cited

U.S. PATENT DOCUMENTS

| | | | |
|---|---|---|---|
| 4,329,640 | 5/1982 | Reiner et al. | 371/22.5 |
| 4,433,413 | 2/1984 | Fasang | 364/900 |
| 4,635,261 | 1/1987 | Anderson et al. | 371/22.5 |
| 4,651,298 | 3/1987 | Currier, Jr. | 371/16 |
| 5,051,944 | 9/1991 | Fetterolf et al. | 364/16.2 |
| 5,109,503 | 4/1992 | Cruickshank et al. | 395/500 |
| 5,115,502 | 5/1992 | Tallman | 395/500 |

*Primary Examiner*—Emanuel T. Voeltz
*Assistant Examiner*—Thomas Peeso
*Attorney, Agent, or Firm*—Blakely, Sokoloff, Taylor & Zafman

[57] ABSTRACT

An apparatus for measuring and monitoring various parameters that contribute to the performance of a processor includes a pair of programmable event counters for counting any two independent events selected from a predetermined list of processor events. A specialized register controls the operation of the event counters and also selects the events to be counted. The contents of the event counters can be accessed either by a supervisor mode program which reads an instruction or through a special access port.

23 Claims, 1 Drawing Sheet

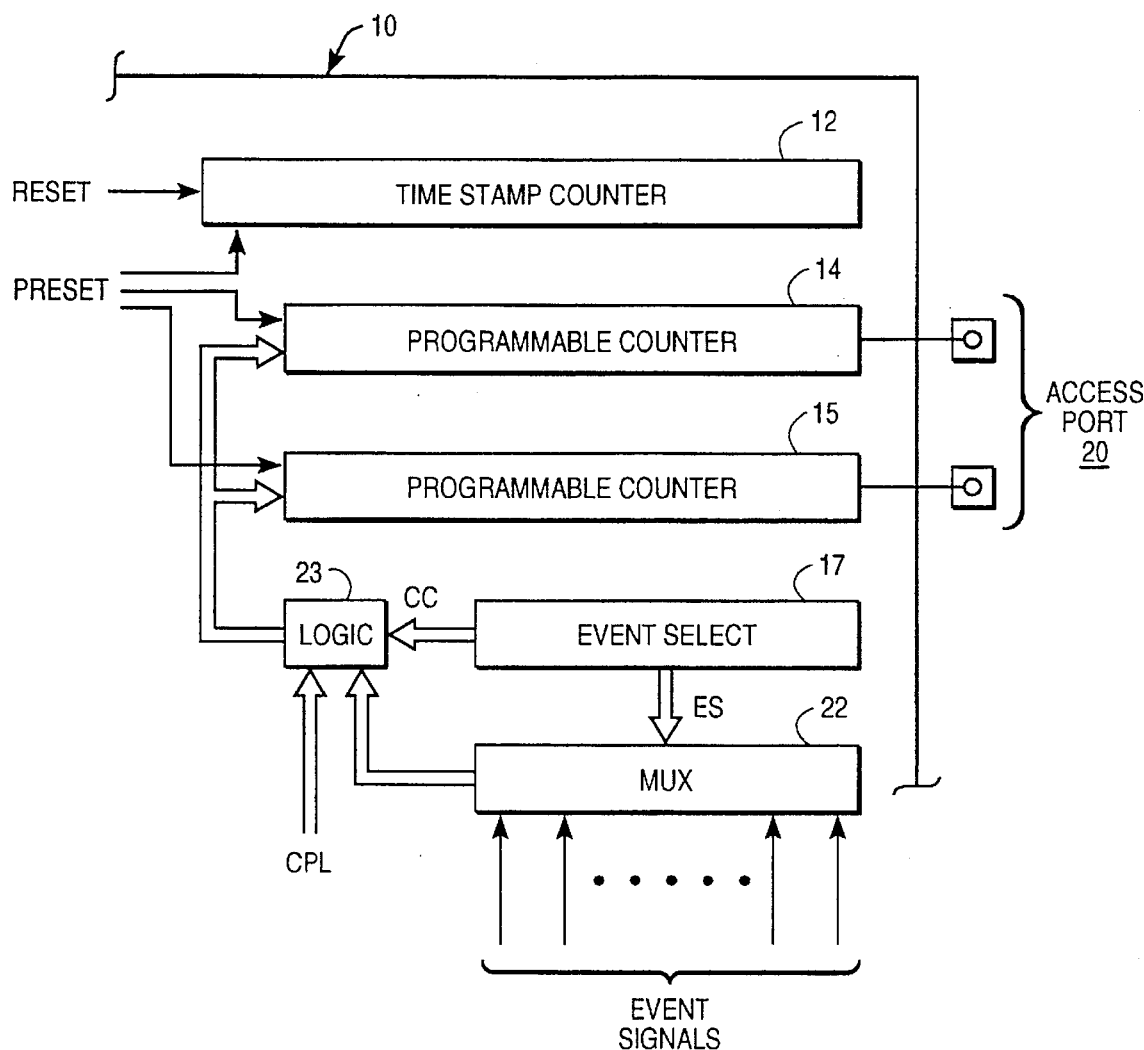
FIG_1
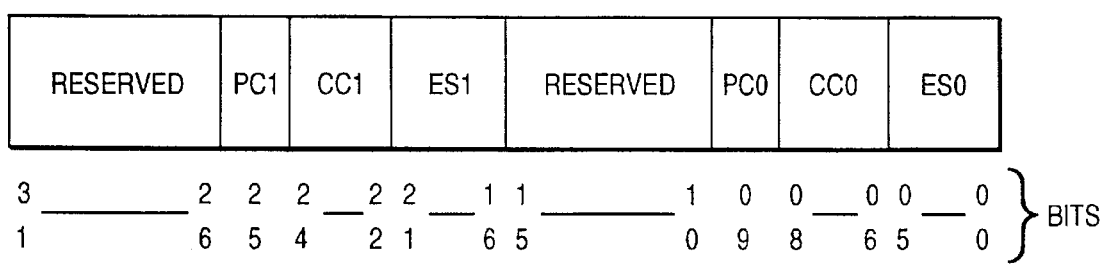
FIG_2

APPARATUS FOR MONITORING THE PERFORMANCE OF A MICROPROCESSOR

FIELD OF THE INVENTION

The present invention relates to the field of microprocessors. More specifically, the invention relates to features incorporated within microprocessors which are designed to assist system hardware and software developers.

BACKGROUND OF THE INVENTION

The technology of microcomputer architecture and design has made incredible advances in the past several decades. New architectural ideas combined with advances in integrated circuit technology have combined to create a series of machines which achieve remarkable performance results.

One way that computer architects can further improve the performance of their machines is by measuring and monitoring the various parameters that affect the performance of the processor. For example, by measuring the system performance of the machine when it is executing its intended applications, the computer architect is better assisted in his effort to design a balanced computer system.

In the past, system architects and designers typically relied upon logic analyzers and other external hardware to generate statistical information concerning the operation of a computer. Most often, this type of information was gathered from huge mainframe computers. However, because the processing unit (CPU) is a single integrated circuit, it is largely inaccessible. The internal operation of microprocessors has generally remained a so-called "black box" mystery. Lack of a means for obtaining statistics on the operation of CPUs has impeded further advances in computer design; this information would also be useful for both compiler and system memory tuning.

What is needed then is a means for monitoring the performance of a microprocessor by obtaining statistical information produced by the central processing unit. As will be seen, the present invention comprises an apparatus for measuring and monitoring various parameters that contribute to the performance of a microprocessor. One of the advantages of the present invention is that it makes it possible to measure such parameters as data and instruction cache hit rates, clocks per instruction (CPI), time spent waiting for external bus functions, etc. The performance monitor of the present invention also allows compiler writers to gauge the effectiveness of instruction scheduling algorithms by measuring address generation interlocks and parallelism.

SUMMARY OF THE INVENTION

A computer system which includes a feature for measuring and monitoring various parameters that contribute to the performance of a processor is described. In one embodiment, the invention comprises a plurality of programmable event counters for counting a number of independent events selected from a predetermined list of events which normally occur during the operation of the processor. A means for controlling the operation of the event counters and also for selecting the events to be counted is provided by a specialized register. The register includes a first field of bits for choosing the particular event to be counted, and a second field of bits for selecting between counting the event chosen by the first field and counting clock cycles of the CPU. The second field also can be set to disable the counters.

The contents of the event counters can be accessed by one of two means. First, a supervisor mode program may read and program the counters using a microprocessor executable instruction. Alternatively, the performance monitor feature may be accessed directly through a special access port. In this latter case, access to the event counters is achieved without interruption of the CPU.

BRIEF DESCRIPTION OF THE DRAWINGS

The present invention will be understood more fully from the detailed description which follows and from the accompanying drawings, which, however, should not be taken to limit the invention to the specific embodiments shown but are for explanation and understanding only.

FIG. 1 is a block diagram of the performance monitor feature of the present invention.

FIG. 2 illustrates the control and event select register for controlling the operation of the event counters in the present invention.

DETAILED DESCRIPTION

A computer system which includes a feature to measure and monitor various parameters that contribute to the performance of a processor is described. The information gathered can be used, by way of example, for compiler and memory system tuning. In the following description, numerous specific details are set forth such as event types, bit lengths, register sizes, etc., in order to provide a thorough understanding of the present invention. It will be obvious, however, to one skilled in the art that these specific details may not be needed to practice the present invention.

By way of example, the list of particular events which may are monitored in the current embodiment are by definition implementation dependent. Consequently, these events are not to be considered part of any particular processor architecture and may change for different implementations and/or embodiments of the invention. In other instances, well-known computer architectural elements and electrical circuits have not been described in particular detail in order to avoid unnecessarily obscuring the present invention.

FIG. 1 illustrates an integrated circuit comprising a microprocessor 10 having a central processing unit (CPU) which executes a program of instructions. Included on the integrated circuit is an apparatus for monitoring the performance of the microprocessor—particularly the various parameters and events associated with the operation of the central processing unit.

It should be understood that an "event"—as that term is used in the context of the present invention—constitutes a logic signal or other electrical signal that indicates the occurrence or duration of some particular activity on the chip. Typically, the signals which comprise the list of events monitored by the present invention are ones which already exist or am generated as part of the normal operation of the microprocessor—these signals otherwise being used by the chip for its own logical correctness.

The performance monitoring apparatus comprises a time stamp counter 12 which may be reset or preset by the CPU. Also included are a pair of programmable counters 14 and 15, coupled to a control and event select register (CESR) 17. Control and event select register 17 is utilized for controlling programmable counters 14 and 15, and also for selecting the events to be counted by the respective counters. These events include things such as cache hits, clock pulses, address generation interlocks, etc. The contents of programmable counters 14 and 15 may be programmed by a processor instruction, or alternatively, through an external access port 20. The programming aspects of the present invention will be described in more detail below.

Time stamp counter 12 is a dedicated, free-running 64-bit counter in the current embodiment which increments on every clock cycle of the processor. Time stamp counter 12 continues to count unless specifically reset, preset or disabled by the central processing unit. One way that counter 12 may be accessed is by a user level read time stamp counter instruction. This instruction is provided in the current embodiment to allow a program of any privilege level to sample the value of counter 12. This occurs without disruption of the count or operation of the CPU. The operating system may also disable the time stamp counter feature in secure environments.

A supervisor mode program can be used to sample the contents of counter 12 at any time using a read from model-specific register (RDMSR) instruction provided for in a current embodiment. It should be noted that counter 12 is cleared whenever the central processing unit is reset. A supervisor mode program may also reset or preset counter 12 using a write to model-specific register (WRMSR) instruction. Either the RDMSR or WRMSR instructions copy the contents of the specific counters into a pair of registers.

It is appreciated that utilizing a single instruction to read or write both portions (i.e., the upper and lower 32 bits) of the counter overcomes problems of wraparound. In the current embodiment, the higher order 32-bits are copied into a register EDX, while a register EAX is loaded with the lower order 32-bits.

Selected events are monitored in the present invention by two programmable 40-bit counters 14 and 15 provided on-chip. Each of these counters may be programmed to count any two events from a predetermined list of events. By way of example, the list of events which may be selected by event select register 17 in a current embodiment is provided in Appendix 1. The events to be counted by programmable counters 14 and 15 are selected by programming CESR 17. For each counter, CESR 17 contains a 6-bit event select field (ES), a pin control bit (PC), and a 3-bit control field (CC). Control and event select register 17 is illustrated in FIG. 2.

The multiplexing of the event signals provided on microprocessor 10 is performed by block 22, as controlled by CESR 17. In the current embodiment, the selected event signals output by MUX 22 are combined with control field and current privilege level (CPL) information in logic block 23. Thus, control and event select register 17 effectively controls MUX 22 and logic block 23 which route the appropriate group of signals to each of the 40-bit counters depending on the particular event selected.

It is important to note that a single register—control and event select register 17—controls all of the programmable event counters. This means that in addition to programming, both of the event counters of FIG. 1 can be either enabled or disabled simultaneously. This feature allows the counters to operate in concert with one another, thereby maintaining synchronous counting as a function of time. Practitioners will appreciate that controlling the counters in this manner is crucial to avoiding disabling interrupts. Furthermore, since monitoring particular aspects of a processor's performance sometimes requires the calculation of specific rates (e.g., cache miss rates, hit rates, clocks per instruction, etc.) it is critical that the synchronous operation of the event counters be preserved.

The event counters have two pins, PM0 and PM1, and two bits, PC0 and PC1, which control their operation. The PM0 and PM1 pins may be used to correlate internal events with externally occurring events. Each pin may be individually programmed to indicate either that the associated counter has incremented or that it has overflowed. For example, in the current embodiment, PC=0 indicates that the counter has incremented, whereas PC=1 means that the counter has overflowed. When the pins are configured to signal that a counter has incremented it should be noted that although the counters may change or increment by 1 or 2 in a single clock, the pins can only indicate that the event has occurred.

A "count up to" function may be provided when the event pin is programmed to signal an overflow of the counter. Because the counters are 40-bits in length, a carry-out of bit 39 indicates an overflow. Accordingly, each counter may be preset to a specific value less than $2^{40-1}$. After the counter has been enabled and the prescribed number of events has transpired, the counter will overflow. In the current embodiment, the overflow is indicated externally (approximately five clocks later), and appropriate action is then taken (such as signalling and interrupt).

Thus, the overflow indication feature can be used to emulate a countdown function. By way of example, a counter can be preset to a value ten less than overflow (i.e., $2^{40-1}-10$); the overflow condition then being an indication of event occurrence. Practitioners in the art will appreciate that the process of preloading a value into a counter, and then signalling when that value has been reached by means of an overflow indicator is simpler and less cumbersome than using traditional up/down counters.

It is also important to realize that because counters 14 and 15 are 40-bits in length, they are capable of monitoring events over a period greater than three hours when operated at 100 MHz. At any time during the monitoring process, system software can program/sample the contents of each of registers 14 and 15 through the execution of a single instruction: the WRMSR instruction for programming and the RDMSR instruction for sampling.

A 3-bit control field is utilized to control the operation of the event counters. The highest order bit selects between events and counting clocks. The middle bit enables counting only when the current privilege level (CPL) is equal to 3 (the higher the number the lower the privilege level). The lower order bit enables counting when CPL equals 0.1 or 2. Table 1 belows shows the particular coding of the 3-bit control field utilized in the current embodiment.

TABLE 1

| Control Code | Result |
|---|---|
| 000 | Count nothing (disable counter) |
| 001 | Count the selected event while the CPL equals 0, 1, or 2 |
| 010 | Count the select event while the CPL = 3 |
| 011 | Count the selected event regardless of the CPL |
| 100 | Count nothing (disable counter) |
| 101 | Count clocks while the CPL = 0, 1 or 2 |
| 110 | Count clocks while the CPL = 3 |
| 111 | Count clocks regardless of the CPL |

Current privilege level information is effectively masked with clock and event occurrences to greatly expand the versatility of the performance monitor of the present invention. In other words, the invention is capable of qualifying events as to whether the CPU is functioning in a supervisor or application level of operation. Masking CPL information makes it possible, for example, to monitor events such as system level (OS) cache miss rates, as distinguished from user level cache misses. This feature enhances the usefulness of the present invention and provides a significant additional component of information.

Upon a reset, all of the bits in the control and event select register are cleared. After reset, counters 14 and 15 are undefined. Note that these counters are usually not affected by writes to the control and event select register. It is the software's obligation to clear or preset the control and event select register so as to control both counters at the same time. It should also be understood that while a counter may be stopped to sample the contents, it is not required to do so in the current embodiment.

Importantly, the counters 14 and 15 are non-intrusive to the CPU; that is, the counting of certain events does not modify the behavior or slow down the operation of the CPU. Conversely, the act of reading the counters does not disturb the operation of the counters themselves. That is, the contents of registers 14 and 15 may be accessed in a non-intrusive manner utilizing either the RDMSR instruction or through access port 20.

As explained earlier, the entire control and event select register 17 is altered whenever that register is written to. This insures that all of the counters will be controlled at the same time to maintain synchronous counting. By way of example, if only one event needs to be changed the register 17 is first read, the appropriate bits modified, and all 32-bits are written back into register 17. Up to two independent events may be monitored by placing the appropriate event code in the event select fields.

External access to the counters 14 and 15 is provided without interrupting the CPU through access port 20. Note that if the performance monitor counters are being accessed through port 20, then they must not be simultaneously accessed by the CPU through the read/write model-specific register instructions. Counters 14 and 15 are externally accessible through port 20 using the IEEE 1149.1 JTAG Boundary Scan Mechanism. The JTAG interface, as described in IEEE standard 1149.1, defines a standard which allows data to be exchanged between the component and the external system and allows instructions to be fed to the component.

The events to be monitored by the present invention may be considered to be of two types: those that count occurrences and those that count durations. (Again, these events are listed in Appendix 1). Occurrence events are counted in a single clock cycle. If an event can happen twice in one clock cycle, the counter is incremented by two. For duration events, counter 14 and 15 count the total number of clocks that the condition is true.

As an example of the versatility of the present invention, consider as an example the situation in which it is desirable to monitor the cache miss rate of the processor. For this situation, one of the counters 14 or 15 is programmed to count the number of read/write operations which occur. The other counter is programmed to count the number of misses. Together, these two event counts can be used to derive the cache miss rate (The number of read/writes divided by the number of misses). In general, the performance monitor feature can be used to monitor a few key signals, which can then be combined to generate statistics on the operation of the CPU. These statistics, of course, are significant from the standpoint of a system designer or computer architect.

Whereas many alternations and modifications to the present invention will no doubt become apparent to the person of ordinary skill in the art after having read the foregoing description, it is to be understood that the particular embodiments shown and described by way of illustration are in no way intended to be limiting. For example, although this disclosure has shown a particular list of events that may be monitored, other events, conditions or signals may also be monitored without detracting from the spirit or scope of the present invention. Therefore, reference to the details of the illustrated diagrams is not intended to limit the scope of the claims which themselves recite only those features regarded as essential to the invention.

APPENDIX 1

| Performance Monitoring Event | Type |
| --- | --- |
| Data Read | OCCURRENCE |
| Data Write | OCCURRENCE |
| Data Read or Data Write | OCCURRENCE |
| Data TLB Miss | OCCURRENCE |
| Data Write Miss | OCCURRENCE |
| Data Read Miss or Data Write Miss | OCCURRENCE |
| Write (hit) to M or E state lines | OCCURRENCE |
| Data Cache Lines Written Back | OCCURRENCE |
| Data Cache Snoops | OCCURRENCE |
| Data Cache Snoop Hits | OCCURRENCE |
| Memory Accesses in Both Pipes | OCCURRENCE |
| Bank Conflicts | OCCURRENCE |
| Misaligned Data Memory Reference | OCCURRENCE |
| Code Read | OCCURRENCE |
| Code TLB Miss | OCCURRENCE |
| Code Cache Miss | OCCURRENCE |
| Any Segment Register Loaded | OCCURRENCE |
| Segment Descriptor Cache Accesses | OCCURRENCE |
| Segment Descriptor Cache Hit | OCCURRENCE |
| Branches | OCCURRENCE |
| BTB Hits | OCCURRENCE |
| Taken Branch or BTB Hit | OCCURRENCE |
| Pipeline Flushes | OCCURRENCE |
| Instructions Executed | OCCURRENCE |
| Instructions Executed in the v-pipe e.g., parallelism/pairing | OCCURRENCE |
| Clocks while a bus cycle is in progress (bus utilization) | DURATION |
| Pipeline stalled waiting because writes are backed up | DURATION |
| Pipeline stalled waiting for data memory read | DURATION |
| Number of clocks the P5 is stalled while trying to write to an E or M state line while EWBE# is de-asserted | DURATION |
| Locked Bus Cycle | OCCURRENCE |
| I/O Read or Write Cycle | OCCURRENCE |
| Non-cacheable memory references | OCCURRENCE |
| Pipeline stalled because of an address generation interlock | DURATION |
| FLOPs | OCCURRENCE |
| FXCH issued in parallel | OCCURRENCE |
| Floating Point Pipe Busy | DURATION |
| Floating Point Pipe Stalled | DURATION |
| Clocks while interrupts are disabled | DURATION |
| Hardware Interrupts | OCCURRENCE |

What is claimed is:

1. An apparatus embedded in a microprocessor for monitoring the performance of said microprocessor comprising:
   counting means for counting at least one event selected from a predetermined list of events resulting from the normal operation of said microprocessor;
   controlling means for controlling said counting means and for choosing said at least one event from said list; and
   accessing means for accessing said counting means to determine the count of said at least one event.

2. The apparatus of claim 1 wherein said counting means comprises a plurality of programmable counters.

3. The apparatus of claim 2 wherein said controlling means comprises a register, for each counter said register including a first field of bits for choosing an event to be counted.

4. The apparatus of claim 3 wherein said register further comprises, for each counter, a second field of bits for selecting between counting said event chosen by said first field and counting clock cycles of said microprocessor.

5. The apparatus of claim 4 wherein said second field of bits also functions to disable said counters.

6. The apparatus of claim 5 wherein said accessing means comprise instruction means within said microprocessor for reading the count from each of said counters.

7. The apparatus of claim 6 wherein said list of events includes occurrence and duration events.

8. The apparatus of claim 7 further comprising a free-running time stamp counter incrementing on every clock cycle of said microprocessor, said time stamp counter being accessed by said instruction means.

9. The apparatus of claim 5 wherein said accessing means comprises an external port coupled to said counters.

10. The apparatus of claim 4 wherein said microprocessor includes a protection mechanism comprising a plurality of privilege levels and wherein said controlling means further includes a means for masking the current privilege level of either said event chosen by said first field or said clock cycles.

11. A computer system which includes a central processing unit (CPU) and an apparatus for monitoring the performance of said CPU, said apparatus comprising:
- a plurality of programmable event counters for counting two or more independent events from a predetermined list of events resulting from the normal operation of said microprocessor;
- a register controlling the operation of said event counters, said register also selecting the events to be counted from said list of events; and
- a means for accessing said event counters to determine the current count of said events.

12. The computer system of claim 11 wherein said accessing means comprises instruction means within said processor for reading said count without disturbing the operation of said counters.

13. The computer system of claim 11 wherein said accessing means further comprises an external port coupled to said plurality of programmable event counters, said external port providing direct access to said count without interfering with said normal operation of said microprocessor.

14. The computer system of claim 13 wherein said register includes for each counter, a first field of bits for choosing an event to be counted.

15. The computer system of claim 14 wherein said register further comprises, for each said counter, a second field of bits for selecting between counting said event chosen by said first field and counting clock cycles of said CPU, said second field also for disabling said counters.

16. The computer system of claim 15 further comprising a means for stopping and clearing said counters before selecting a new event.

17. The computer system of claim 15 further comprising a means for presetting said counters to a certain state.

18. The computer system of claim 17 further comprising a means for indicating an overflow condition of said counters.

19. The computer system of claim 18 wherein said apparatus further comprises a free-running time stamp counter incrementing on every clock cycle of said CPU, said time stamp counter being accessed by said instruction means.

20. The computer system Of claim 15 wherein said predetermined list of events includes occurrence and duration events.

21. An apparatus incorporated in an integrated circuit (IC) which includes a central processing unit (CPU), said apparatus monitoring the performance of said CPU by recording the occurrence of events resulting from the normal operation of said CPU, each event comprising an electric signal representing the incidence of a particular activity within said IC, said apparatus comprising:
- first and second programmable counters operated synchronously for recording first and second selected events respectively;
- logic circuitry for coupling said first and second selected events to said first and second programmable counters, respectively;
- a control register coupled to said logic circuitry for selecting said first and second selected events; and
- a means for accessing said counters.

22. The apparatus of claim 21 wherein said logic circuitry comprises a multiplexer coupled to receive a plurality of events.

23. The apparatus of claim 22 further comprising a means for qualifying said events as to whether said CPU is operating in a supervisor or application mode.

* * * * *

UNITED STATES PATENT AND TRADEMARK OFFICE
CERTIFICATE OF CORRECTION

PATENT NO.    : 5,657,253
DATED         : August 12, 1997
INVENTOR(S)   : Dreyer et al.

It is certified that error appears in the above-identified patent and that said Letters Patent is hereby corrected as shown below:

Column 1,
Line 29, after "the", insert -- central --.

Column 2,
Line 55, delete "am" and insert -- are --.

Column 4,
Line 44, delete "0.1" and insert -- 0,1 --.

Column 7,
Line 45, delete "includes" and insert -- includes, --.

Column 8,
Line 19, delete "Of" and insert -- of --.
Line 37, delete "a means" and insert -- means --.

Signed and Sealed this

Eighteenth Day of March, 2003

JAMES E. ROGAN
*Director of the United States Patent and Trademark Office*